(12) United States Patent
Duparre et al.

(10) Patent No.: US 9,454,261 B2
(45) Date of Patent: Sep. 27, 2016

(54) OPTICAL NAVIGATION DEVICE AND USE THEREOF

(75) Inventors: Jacques Duparre, Jena (DE); Andreas Brueckner, Jena (DE); Frank Wippermann, Meiningen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 773 days.

(21) Appl. No.: 13/138,161

(22) PCT Filed: Jan. 7, 2010

(86) PCT No.: PCT/EP2010/000045
§ 371 (c)(1),
(2), (4) Date: Oct. 18, 2011

(87) PCT Pub. No.: WO2010/081652
PCT Pub. Date: Jul. 22, 2010

(65) Prior Publication Data
US 2012/0026093 A1    Feb. 2, 2012

(30) Foreign Application Priority Data
Jan. 19, 2009   (DE) .................. 10 2009 005 092

(51) Int. Cl.
*G06F 3/033*   (2013.01)
*G06F 3/042*   (2006.01)
*G06F 3/0354*   (2013.01)

(52) U.S. Cl.
CPC ......... *G06F 3/0425* (2013.01); *G06F 3/03547* (2013.01); *G06F 2203/04109* (2013.01)

(58) Field of Classification Search
CPC ............... G06F 3/0304; G06F 3/0317; G06F 3/03543; G06F 3/03547; G06F 3/042; G06F 3/0421; G06F 3/0425; G06F 2203/0338; G06F 2203/04109; H01L 27/144; H01L 27/14625; H01L 27/14627; H01L 27/14643; G02B 3/005; G02B 3/0056; G02B 3/0062; G02B 3/0068; G02B 13/003; G02B 13/0035; G02B 13/004; G02B 13/0045; G02B 13/0085
USPC .................................. 345/156–173
See application file for complete search history.

(56) References Cited

U.S. PATENT DOCUMENTS

| | | | |
|---|---|---|---|
| 5,942,761 A * | 8/1999 | Tuli ........................... 250/556 |
| 6,028,660 A * | 2/2000 | Van Der Laan .... G03F 7/70058 355/53 |
| 6,043,481 A * | 3/2000 | Tan et al. ...................... 250/216 |
| 6,643,390 B1 * | 11/2003 | Clark et al. ................... 382/124 |
| 6,967,321 B2 | 11/2005 | Leong et al. |
| 7,045,775 B2 | 5/2006 | Leong et al. |

(Continued)

FOREIGN PATENT DOCUMENTS

DE    10 2006 004 802 A1    8/2007
DE    10 2007 042 984 A1    3/2009

(Continued)

*Primary Examiner* — Amr Awad
*Assistant Examiner* — Roberto Flores
(74) *Attorney, Agent, or Firm* — Marshall & Melhorn, LLC

(57) ABSTRACT

The invention relates to an optical navigation device based on production on wafer scale, in which both the illumination path and the imaging lens system are integrated on a common carrier structure. The optical navigation devices according to the invention are used for controlling a cursor on an image output device or in the field of finger navigation.

24 Claims, 13 Drawing Sheets

(56) References Cited

U.S. PATENT DOCUMENTS

| | | | |
|---|---|---|---|
| 7,164,782 B2 | 1/2007 | Baharav et al. | |
| 7,242,027 B2 | 7/2007 | Schranz | |
| 7,244,925 B2 * | 7/2007 | Xie | 250/221 |
| 7,521,719 B2 | 4/2009 | Schranz | |
| 7,897,903 B2 | 3/2011 | Duparre et al. | |
| 2004/0084610 A1 * | 5/2004 | Leong et al. | 250/221 |
| 2004/0208346 A1 * | 10/2004 | Baharav | G06F 3/0317 |
| | | | 382/124 |
| 2004/0208347 A1 * | 10/2004 | Baharav et al. | 382/124 |
| 2004/0208348 A1 * | 10/2004 | Baharav et al. | 382/124 |
| 2006/0208170 A1 * | 9/2006 | Xie | 250/221 |
| 2006/0279845 A1 * | 12/2006 | Gurevich et al. | 359/622 |
| 2007/0057929 A1 * | 3/2007 | Xie | 345/175 |
| 2007/0109272 A1 * | 5/2007 | Orsley et al. | 345/173 |
| 2007/0109273 A1 * | 5/2007 | Orsley et al. | 345/173 |
| 2007/0215793 A1 * | 9/2007 | Gruhlke et al. | 250/221 |
| 2007/0262243 A1 * | 11/2007 | cheah et al. | 250/214 R |
| 2008/0088853 A1 * | 4/2008 | Hwang et al. | 356/498 |
| 2008/0159599 A1 * | 7/2008 | Kajihara et al. | 382/115 |
| 2009/0166643 A1 | 7/2009 | Schranz | |
| 2009/0179142 A1 * | 7/2009 | Duparre | G02B 3/0031 |
| | | | 250/208.1 |
| 2011/0134040 A1 | 6/2011 | Duparre et al. | |

FOREIGN PATENT DOCUMENTS

| | | |
|---|---|---|
| GB | 2 400 714 A | 10/2004 |
| JP | 2003-283932 A | 10/2003 |
| WO | WO 2007082781 A1 * | 7/2007 |

\* cited by examiner

Fig. 8
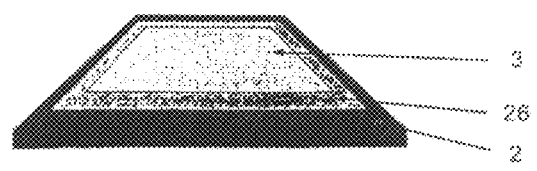
a)
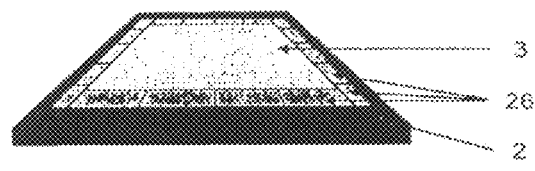
b)

OPTICAL NAVIGATION DEVICE AND USE THEREOF

BACKGROUND OF THE INVENTION

The invention relates to an optical navigation device based on production on wafer scale, in which both the illumination path and the imaging lens system are integrated on a common carrier structure. The optical navigation devices according to the invention are used for controlling a cursor on an image output device or in the field of finger navigation.

In the case of optical navigation sensors, a surface region of the so-called tracking surface is illuminated as homogeneously as possible by a source for electromagnetic radiation, e.g. an LED or a laser diode, and corresponding beam-forming lens system. Subsequently, by means of an objective lens, either the illuminated tracking surface is imaged directly (in the case of the LED) or the speckle pattern produced by the reflection on the tracking surface (in the case of the laser diode) is imaged on a digital image sensor. The image recording takes place in a very rapid sequence (1,500-6,000 images per second) in succession. Successively recorded images are correlated with each other and the displacement of the images amongst each other, with reference to representative structures of radiation which is scattered or refracted on the tracking surface, is used as a measure for the size and speed of the displacement of the input device relative to the tracking surface or of a reference object relative to the input device. This is converted in turn into the movement of the mouse pointer on a display.

Miniaturisation of such an optical navigation sensor can be subdivided in steps in miniaturisation of the imaging lens system and miniaturisation of the illuminating lens system. Consequently, both lens systems must be miniaturised in common in order to achieve as great a total miniaturisation as possible.

For miniaturisation solely of the imaging lens system, the multichannel arrangement described in DE 10 2007 042 984 may be cited.

Furthermore, single-channel optical arrangements for illumination, as also for imaging the tracking surface, are known. As a result of the progressive miniaturisation and the short focal intercepts resulting therefrom, these incur however corresponding disadvantages in principle.

Problems now arise with the given diagonal of the image sensor during miniaturisation of the optical construction, since a reduction in constructional length for the outer image regions involves very large angles relative to the optical axis of the lens system (reverse imaging) and consequently the resolution of the imaging is greatly reduced because of off-axis aberrations and the brightness is greatly reduced because of the natural vignetting at the image edge.

To the same degree, the shortening of the existing construction represents a requirement for the illumination path since a shortening of the total construction means not only a shortening of the lens system imaging the tracking surface but also of the object distance. As a result of a smaller object distance, in the case of the present configuration, the illumination radiation would beam in at a very flat angle onto the tracking surface, which leads to a non-homogeneous illumination and reduced efficiency (usable radiation/emitted radiation). Furthermore, a large number of reflections of the illumination radiation is necessary, which leads to increased scattering and false light and hence reduces the image contrast. Furthermore, the separation of the imaging and illuminating lens system limits further miniaturisation.

Starting herefrom, it was the object of the present invention to provide an optical navigation device which eliminates the disadvantages known from the state of the art and presents a miniaturised device which enables, on the one hand, homogeneous illumination of the object to be imaged and efficient imaging onto the image sensor.

This object is achieved by the optical navigation device having the features of claim 1 and the input device having the features of claim 23. In claim 25, uses according to the invention are indicated. The further dependent claims reveal advantageous developments.

BRIEF SUMMARY OF THE INVENTION

According to the invention, an optical navigation device is provided, which is produced by wafer technology and has the following components:
a) an image sensor array having a large number of image sensor units disposed in an array, having respectively at least one light-sensitive surface,
b) at least one microlens array which is assigned to the image sensor array and disposed between an object to be imaged and the image sensor array, at least one microlens being assigned to each image sensor unit and also
c) at least one radiation source having at least one associated beam-forming lens system.

It is an essential feature of this device that the image sensor array and the at least one radiation source are disposed together on the same carrier structure and also at least one microlens array and at least one beam-forming lens system are disposed together on the same optically transparent substrate.

The device according to the invention is essentially distinguished in that
- the microoptical illuminating and imaging lens system are disposed on a common carrier structure,
- a single or multichannel lens system arrangement for the illumination array is integrated in the device,
- a multichannel lens system arrangement is present in the imaging array and
- integration of the at least one radiation source on the same electronic printed circuit board or even on the same semiconductor substrate section as the image sensor array.

The result of this measure is as great as possible a miniaturisation of the optical navigation sensor. Miniaturisation implies here the reduction in the total volume but above all production of a very thin construction (constructional height less than 2 mm). Furthermore, by using microoptical production methods on a wafer scale, inter alia the parallel production of imaging microlens arrays and beam-forming lens system on the same substrate carrier, a reduction in the production costs can be achieved with a corresponding number of parts. A shorter illumination distance achieved by the miniaturisation and the possibly additionally larger angle of incidence ensure higher illumination efficiency, which leads hence to a greater signal-to-noise ratio or, in the case of a dimmed light source, to less current consumption. The latter is relevant above all with respect to use in portable terminals.

Due to the arrangement of radiation source(s) and detectors on a common carrier structure, a small basic area of the optical navigation sensor is achieved from the start and the way is prepared for completely new substrate-based assembly methods, inter alia due to significantly increased precision of the relative positions of illumination source and image sensor array and also the arrangement thereof more or less in one plane. A microoptical module, i.e. microlens array(s) with one or more additional components which differ in at least one property, such as e.g. radius of curvature, lateral diameter, pitch, focal width, surface profile, from the microlenses, is placed on this common carrier structure in order to ensure, on the one hand, illumination of the tracking surface and, on the other hand, imaging of the illumination light scattered or refracted on the latter.

On the imaging side, the object parts corresponding to the image sensor coordinate are transmitted not at an angle or diagonally through the lens system, as is the case with conventional optical navigation sensors, but instead perpendicularly. Corresponding object- and image parts are situated directly opposite each other so that no reversed but upright imaging is produced. Here, each object part is transmitted essentially "on axis", i.e. with a small angle of incidence relative to the respective optical axis. For this purpose, an array-type imaging is required, in which there is assigned to each at least one image pixel, its at least one separate microlens.

The illumination array is distinguished preferably by the following features:

The illumination array is situated with the imaging lens system on the same optically transparent carrier structure, e.g. a section comprising glass substrate or plastic material spacing layer, and consists of the same material, in particular plastic material, ORMOCER=inorganic-organic copolymer, glass or composites thereof.

The illumination array acts refractively and/or reflectively and/or diffractively in order to distribute the electromagnetic radiation of the radiation source(s) as homogeneously as possible onto the regions of the tracing surface observed by the imaging lens system.

A multichannel illuminating lens system can be assigned to one individual radiation source, i.e. the illuminating lens system can also be provided as an array or arrangement of uniform or different optical components.

In the case of a plurality of radiation sources, a multichannel illuminating lens system can be assigned to one of the sources or also to a number of radiation sources.

In the case of a plurality of radiation sources, the regions of the tracking surface illuminated by the individual channels of the illuminating lens system can be unjoined or overlap each other at least partially.

Between the illuminating lens system and the optically transparent carrier structure, an aperture diaphragm or an aperture diaphragm arrangement can be situated at a small axial distance from the illuminating lens system. This thereby concerns the same layer which can also contain an aperture diaphragm arrangement for the imaging lens system.

The aperture diaphragm arrangement consists of an absorbing material, e.g. black matrix polymer, and/or a material which is reflecting at least on one side, e.g. a metal, such as titanium, chromium or black chromium or nanostructured silicon (black silicon).

There can be situated between the illuminating lens system with assigned aperture diaphragm arrangement on the optically transparent carrier structure and the semiconductor substrate section, at least one diaphragm or diaphragm arrangement. This concerns the same layer in which a diaphragm arrangement can be provided also in the imaging array. The diaphragm or diaphragm arrangement here serves for restricting the angle spectrum of the electromagnetic radiation of the radiation source and in particular the latter prevents the illumination radiation from passing directly to the image sensor array.

The diaphragm arrangement consists of an absorbing material, e.g. a black matrix polymer, and/or a material which is reflecting at least on one side, e.g. a metal, such as titanium, chromium or black chromium or nanostructured silicon (black silicon).

Between the optically transparent carrier with at least one diaphragm arrangement, a second beam-forming lens system, e.g. a microlens made of an optically transparent material, in particular plastic material, ORMOCER=inorganic-organic copolymer and/or glass, can be situated.

This second beam-forming lens system can act refractively and/or reflectively and/or diffractively in order to collimate and/or to deflect the electromagnetic radiation of the radiation source(s) so that, in cooperation with the illuminating lens system, it is distributed as homogeneously as possible on the tracking surface.

A multichannel, second beam-forming lens system can be assigned to an individual radiation source, i.e. the second beam-forming lens system can also be provided as an array or an arrangement of similarly-shaped or different optical components, e.g. as microlens array.

In particular, from the cooperation of an illuminating lens system configured as array with a second beam-forming lens system configured as an array, with adapted axial distance and possibly lateral offset of the centres from the illuminating lens system and the second beam-forming lens system, a construction leading to homogenisation of the illuminating radiation can be produced similarly to the principle of the honeycomb condenser.

In the case of a plurality of radiation sources, a multichannel, second beam-forming lens system can be assigned to one of the radiation sources or also to a number of radiation sources.

The second beam-forming lens system can also be replaced by a spacer layer made of optically transparent material, in particular plastic material, ORMOCER=inorganic-organic copolymer or glass. In the case of an electrical contacting of the image sensor and/or of the radiation source(s) by bonding wires, this spacer layer is separated laterally from the spacer layer of the imaging array, however is situated in the same axial position. If an electrical rear-side contacting is present (e.g. "through-silicon vias") of the image sensor and/or of the source(s), it can concern the same, laterally connected spacer layer or a lateral structuring of the spacer layer can be dispensed with.

On the rear-side (image- or source-side) of the second beam-forming lens system or spacer layer, a diaphragm or diaphragm arrangement which is assigned to the respective radiation source can be situated. This serves for further restriction of the angle spectrum of the electromagnetic radiation of the radiation source and in particular for preventing radiation from falling directly from the radiation sources onto the image sensor. This diaphragm consists of an absorbing material, e.g. a black matrix polymer and/or a material which is reflecting at least on one side, e.g. a metal such as titanium, chromium or black chromium or nanostructured silicon (black silicon).

The spacer layer of the imaging lens system can differ in its lateral extension and shape of the edging and of the surface profile from the assigned layer of the illuminating lens system, the latter being provided for example as a further beam-forming lens system.

The electromagnetic radiation emitted from the radiation source is distributed by the illuminating lens system, possibly in cooperation with the second beam-forming lens system, onto the regions of the tracking surface observed from the imaging lens system.

The illumination diagram is configured preferably such that the regions of the tracking surface are illuminated as homogeneously as possible, i.e. the radiation intensity of the illumination should vary as little as possible over the area of the tracking surface.

All mentioned illuminating lens systems, diaphragm layers and carrier- or spacer layers have the property that they are situated, with the respective lens systems, diaphragm arrangements, carrier- or spacer layers of the multichannel imaging lens system, laterally in one layer or are provided as a common layer in the imaging and illuminating lens system. This means that the diaphragm arrangements of the imaging lens system are produced from the same material but can differ in their lateral structure or properties, such as e.g. centre distance, opening diameter, shape of the edging.

The imaging lens system is distinguished preferably by the following features:

At least one detector (pixel) is assigned to each microlens of the microlens array.

Each microlens images a region of the tracking surface onto this at least one image sensor unit which is at least as large as the lateral spacing of the microlenses. This ensures a gap-free scanning of the tracking surface, from which 1:1 imaging results, whilst the object range within one channel is imaged reduced to one pixel.

The multichannel imaging lens system can have inclined (rising towards the edge) optical axes. Globally, 1:1 imaging is then no longer present since the imaged object field is greater than the image sensor. In this case, it must be ensured that the object regions assigned to the individual optical channels abut precisely against each other, i.e. the edge length of the object region assigned to each optical channel is then greater than the spacing of the microlenses.

The object distance, for application as optical mouse is from 0.1 to 1 mm and generally, as optical navigation sensor, from 0.1 mm to a few meters.

The imaging lens system consists of at least one microlens array with assigned aperture diaphragm arrangement at a small axial distance from the optical lens surface.

The aperture diaphragm arrangement has analogous properties to the aperture diaphragm arrangement of the illumination array since it concerns the same layer, however in general at least one of the lateral properties, such e.g. opening diameter, shape of the edging, is different between the aperture diaphragms which are assigned to the illuminating lens system and to those assigned to the imaging lens system.

Between the at least one microlens array with its assigned aperture diaphragm arrangement and the image sensor array on a semiconductor substrate section, there is situated at least one optically transparent carrier structure, e.g. a section made of a glass substrate or plastic material spacer layer.

Between carrier structure and detector array, there can be situated at least one diaphragm arrangement for suppressing interfering light and also optical crosstalk, i.e. radiation which is scattered by the object and detected in an optical channel, and is imaged, in an undesired manner, onto a detector of a different imaging channel.

There is situated optionally on this diaphragm arrangement, on the image side, a spacer layer made of an optically transparent material, e.g. plastic material, ORMOCER=inorganic-organic copolymer or glass. The image-side spacer layer can be provided to be laterally structured, e.g. in the case of electrical contacting of the image sensor and/or of the radiation source(s).

On the rear side of the spacer layer, a diaphragm arrangement can be situated directly in front of the detectors, which diaphragm arrangement serves for restriction of the photoactive surface of the detector elements and hence for increasing the resolution. The diaphragm arrangement consists of an absorbing material, e.g. a black matrix polymer, and/or a material which is reflecting at least on one side, e.g. a metal, such as titanium, chromium, black chromium or nanostructured silicon (black silicon).

The imaging lens system is connected, on the image side, for image recording directly to a detector array (image sensor semiconductor section).

Radiation source and image sensor are situated at least on the same printed circuit board (PCB) or even on the same semiconductor section.

Although the aperture diaphragm and other diaphragm arrangements of the illuminating or imaging lens system are situated on the same layer, they can be configured in both or even only in one or the other array or in none of the two.

In the case of the device according to the invention, the individual microlens images a reversed image of the object region situated opposite it. Since the microlens images however only onto one pixel, each object partial region assigned to a lens corresponds precisely to one pixel. The recorded pixel values provide, by simply stringing-together, the image of the tracking surface which is resolved corresponding to the number of lenses in the lens array.

At the object edge, now respectively channels other than in the object centre transmit the object point, however a channel which transmits the object point at almost perpendicular incidence is always found due to the array-like continuation.

By means of a correspondingly chosen number and axial arrangement of diaphragm arrays and correspondingly chosen layer thicknesses of transparent intermediate layers, crosstalk of adjacent channels, which would lead otherwise to false light and hence to reduction in the signal-to-noise ratio, is extensively suppressed. At the same time, the size and position of the opening should however be such that the vignetting of the desired useful light of the individual channel is minimal.

When using diaphragm arrays, precise lateral adjustment of the optical channel (of the microlens) relative to the corresponding detector pixel or detector pixels is necessary. This also means that the arrangement of lenses must be square or rectangular if the arrangement of the detector pixels is corresponding. In this variant, the detector pixels should be significantly smaller than the channel distance in order to achieve a sensible resolution, which leads to a reduced filling factor of the detector pixels in the image sensor matrix and to a comparatively reduced light strength. More sensibly, tightly packed large photodiodes with small diaphragms should not be covered for this purpose, rather the photodiodes should be correspondingly small from the start, which is also advantageous for the signal-to-noise ratio, and the space between the photodiodes should be used for electronic circuits for image read-out, signal amplification, increase in sensitivity, improving the signal-to-noise ratio ("correlated double sampling") or in particular image preprocessing (contrast calculation, measurement of the contrast direction, determination of the image displacement (correlation) detection of optical flow etc.).

The device according to the invention can be produced by wafer technology. This includes the connection to image sensor (adhesion), UV replication of polymer on glass, hot embossing, layer-wise lithographical structure on image sensor, separation by means of wafer saw, advantageously only after completion of the complete layer structure. After separation of the modules (lens system alone or together with image sensor), the sides must be blackened (with absorbing polymer) in order to avoid the lateral coupling-in of false light through the substrate end-faces. In the case of wafer scale connection to the image sensor, rear-side contacting (e.g. through-silicon vias) is advantageous since the optical regions must otherwise be sawn out to be smaller than the regions of the image sensor in order to keep the bonding pads free still for contacting. By means of platform-like structuring of the spacer layer on the active region of the image sensor, damage to the image sensor wafer on the front-side can however be prevented during sawing of the lens system.

BRIEF DESCRIPTION OF THE DRAWINGS

The subject according to the invention is intended to be explained in more detail with reference to the subsequent Figures without wishing to restrict the latter to the special embodiments shown here.

FIG. 8a shows a schematic view on a flat design of the illumination sources and illuminating lens system and FIG. 8b shows the same schematic construction with a micro-structured, i.e. pixelated, electrically individually controllable illumination source.

DETAILED DESCRIPTION OF THE INVENTION

Figure 1:
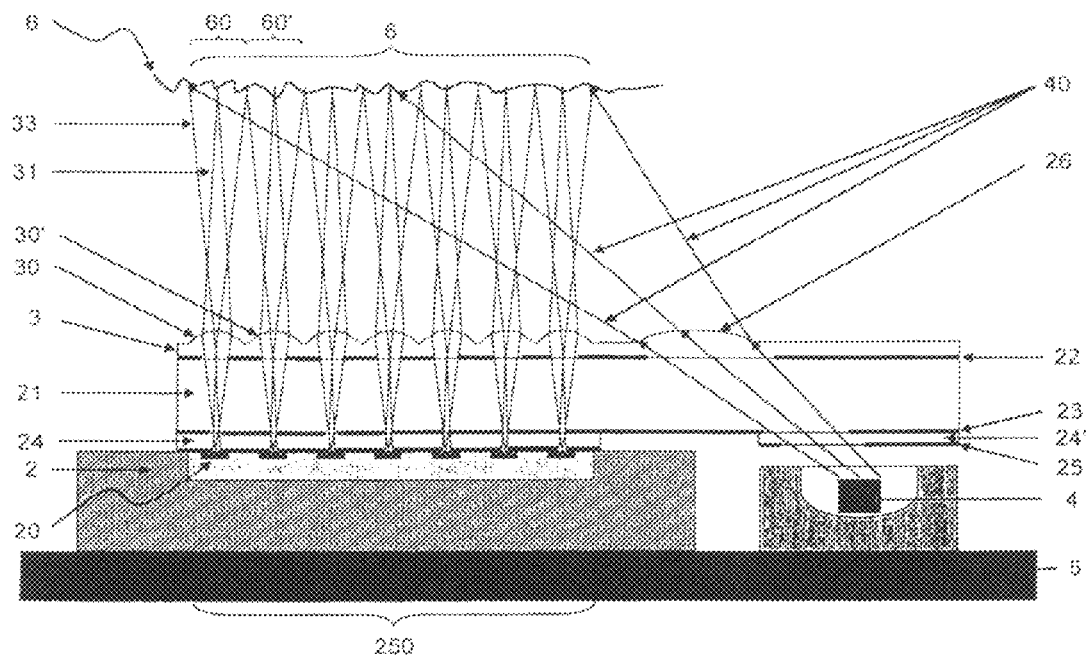
FIG. 1 shows the lens system of a device according to the invention, having a laterally offset light source on a common printed circuit board.

FIG. 1 shows a variant according to the invention in which the semiconductor image sensor 2 with detector pixels 20 and light source 4 (possibly including reflector) are situated on a common electronic carrier (PCB) 5, via which the current supply and the data transfer take place. Thereupon, the lens system, consisting of the microlens array 3 and the peripherally situated beam-forming lens system 26 are positioned on the common transparent carrier 21. The surface of the image sensor 2 thereby serves as mechanical reference (lens system is situated in direct contact with the latter). The light of the radiation source 4 is distributed by the illuminating lens system 26 (optionally in cooperation with the beam-forming lens system 24' and/or possibly with the reflector of the housed light source) on a defined region of the tracking surface 6. The light (edge beams 40 are shown) is thereby distributed as homogeneously as possible on the region of the tracking surface. By means of the offset of the illuminating lens system 26, 24' relative to the centre of the source 4, a beam deflection in the direction of the observed region of the tracking surface can be achieved 6. The consequently resulting flat angle of radiation, even with incoherent illumination, e.g. LED, produces sufficient contrast in the scattering of the light on the microstructure of the surface.

On the imaging side, a separate microlens from the microlens array 3 is assigned to each pixel of the detector arrangement 20 of the image sensor 2 and images an object region 60 onto said microlens array, the edge length of which object region is exactly as large as the spacing of the microlenses (important for object field connection and hence for complete scanning of the tracking surface). There results therefrom globally a 1:1 imaging, whilst within one channel the object region is imaged reduced to one pixel. The observed region of the tracking surface 6 has therefore at least the same extension as the detector arrangement 250. The respective edge beams 33, which are reflected from the edge of the region 60 (or 60') of the tracking surface which is assigned to one microlens 30 (or 30' for the adjacent lens), are imaged on the edge of the assigned pixel. Whilst the centre of the region (evident in red 31) is imaged on the centre of the pixel. The optically transparent carrier 21 serves, on the one hand, as mechanical carrier for the microoptical components 3, 26 and, on the other hand, ensures that the detectors 20 are situated at a corresponding axial distance from the microlens array 3 so that the latter achieves a sharply focused imaging of the respective object region 60 or 60' on the respectively assigned detector.

The aperture diaphragm arrangement 22, on the imaging side, prevents penetration of light in the regions between the individual lenses (30, 30' etc.) of the microlens array 3. To a similar degree, the aperture diaphragm in the illumination array prevents light from being radiated from the source 4 in an undesired direction (e.g. directly onto the detectors of the image sensor or from behind onto the microlens array (restriction of the radiation angle).

The at least one further diaphragm arrangement 23, on the imaging side, serves for suppressing false and interfering light, as is caused for example by optical crosstalk. On the illumination side, this serves to prevent light from passing directly from the source 4 to the detectors of the image sensor. Optionally, the diaphragm arrangement 23 can follow a spacer layer 24 which is important for the mounting and connecting techniques during wafer scale assembly. By means of them, cavities are produced between sensor wafer and lens system wafer, amongst which the electrical contact pads of the sensor (and possibly also of the illumination sources) are situated. The lens system wafer can then be sawn first of all, in order to make accessible from the front the cavities and the pads situated thereunder without damaging the sensor wafer. If however a rear-side contacting (e.g. "through-silicon vias") of the image sensor and/or of the light source(s) is present, these cavities become unnecessary and the spacer layers 24 and 24' can represent the same, laterally connected spacer layer or a lateral structuring of the spacer layer is not necessary.

On the rear-side of the spacer layer 24, on the imaging side, a diaphragm arrangement 25 can be used for the purpose of restricting the photoactive surface of the individual detectors 20 further in order hence to increase the resolution capacity. The diaphragm arrangement 25 is not necessary if the detector pixels are small. On the illumination side, the diaphragm or diaphragm arrangement 25 can possibly likewise be necessary in order to restrict the angle spectrum of the electromagnetic radiation of the source 4, in particular to prevent especially light from passing directly from the source to the detectors of the image sensor.

Figure 2:
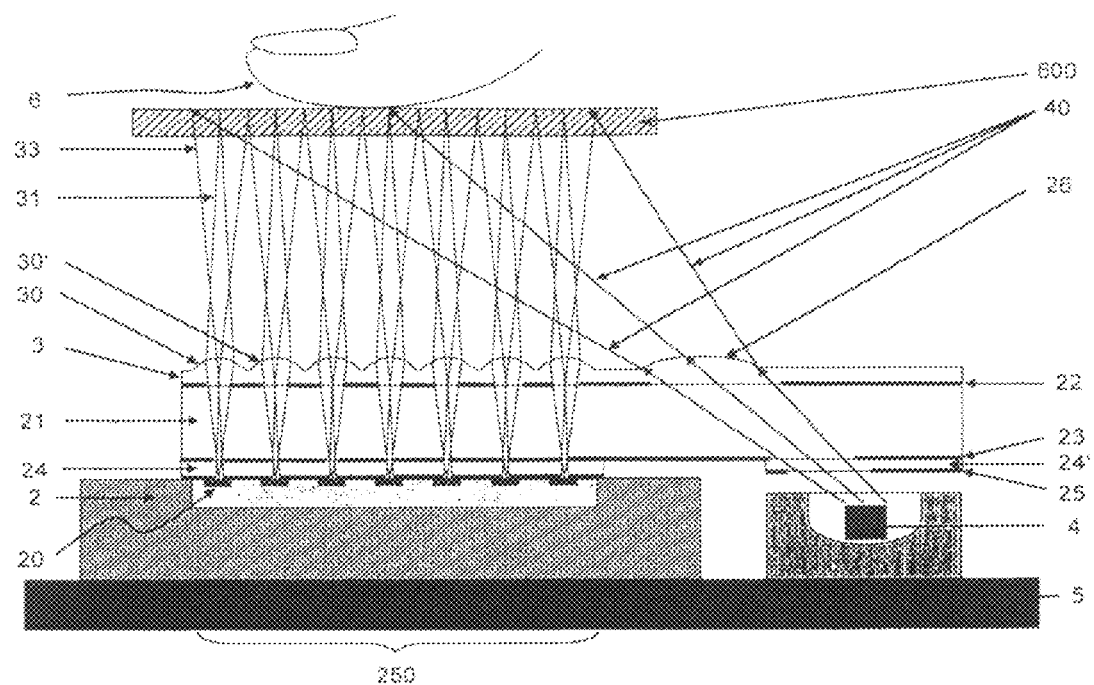
FIG. 2 shows the lens system of a device according to the invention, for optical finger navigation, having a laterally offset light source on a common printed circuit board.

Alternatively (see FIG. 2), the human finger can serve as tracking surface 6 so that the movement of the finger is converted into a movement of the cursor by the optical navigation sensor. A thin, optically transparent protective glass 600 is necessary here as support for the finger and for protection of the optical navigation sensor from contamination. This is positioned between microlens array 3 and the focal plane thereof on the tracking surface 6.

Figure 3:
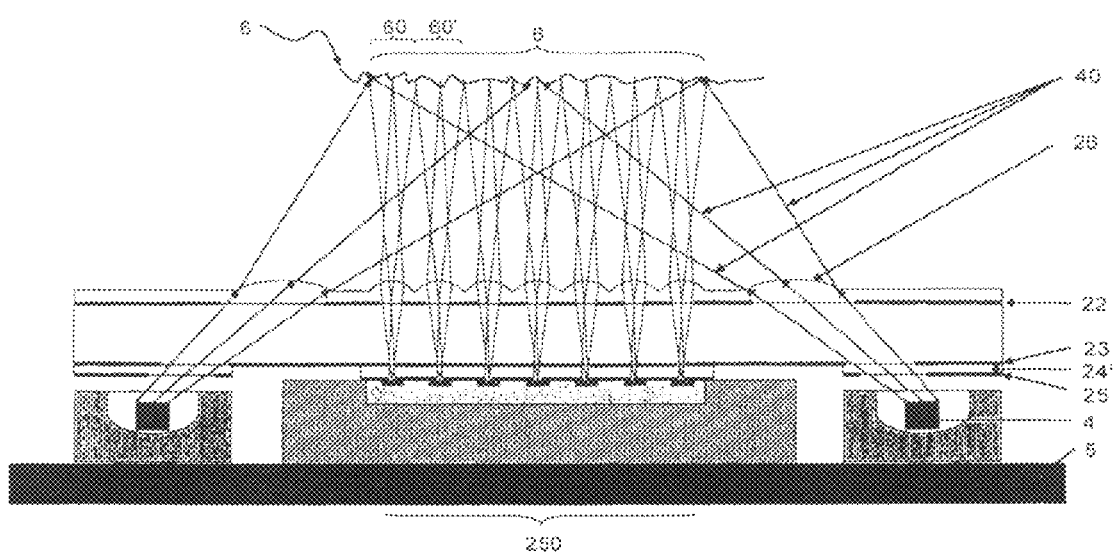
FIG. 3 shows the lens system of a device according to the invention, having multiple laterally offset light sources on a common printed circuit board.

In order to increase the illumination strength and the illumination homogeneity, embodiments with multiple sources can also be used, such as are represented for example in FIG. 3. These can also be distributed in a two-dimensional arrangement on the carrier PCB 5.

Figure 4:
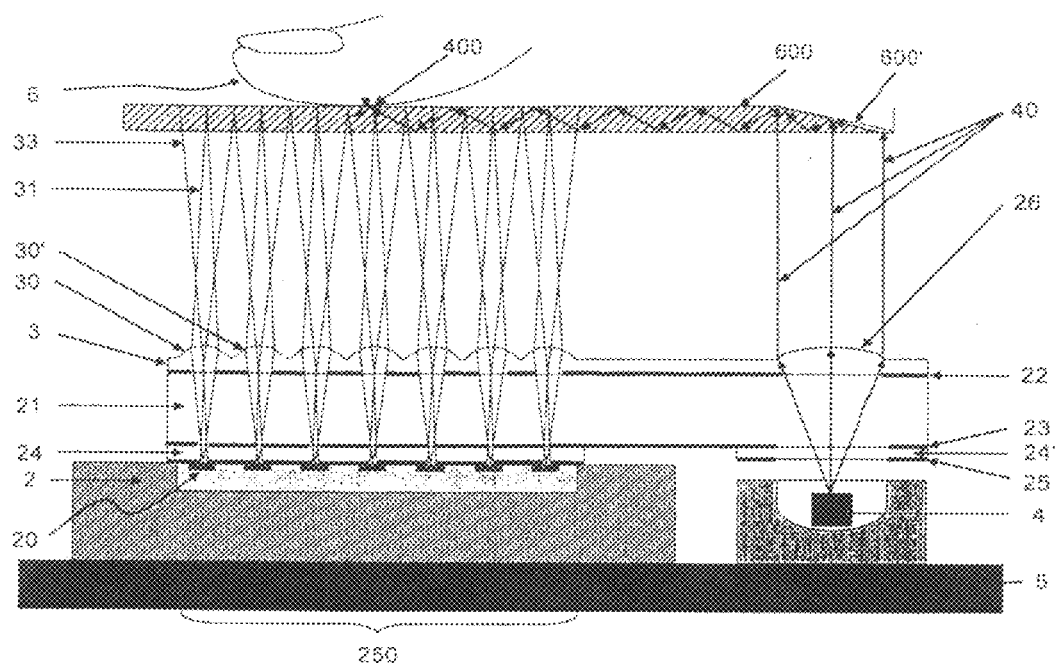
FIG. 4 shows the lens system of a device according to the invention for optical finger navigation, having a laterally offset light source on a common printed circuit board and having a cover glass used in addition for the illumination array.

In the embodiment according to FIG. 4, the optically transparent protective glass 600 serves at the same time as light guide. The illumination light from the source/sources 4 is directed thereby by the beam-forming lens system 26, possibly in cooperation with the second beam-forming lens system 24', onto the ground and mirror-coated front-side of the protective glass 600'. The light beams 40 are deflected there in a direction perpendicular to the optical axes of the imaging channels onto the tracking surface 6 (here the human finger). The light is guided inside the protective glass 600 by total reflection on the upper- and underside of the same until the latter is disturbed by the contact of the human finger or the tracking object with the protective glass at the point 400. At the position of interfered total reflection 400, a brightness difference occurs in the object field in contrast to the illuminated, lateral surrounding field which is detected in the image by the multichannel imaging array. The displacement of the finger or of the tracking object provides the lateral displacement of this brightness difference between the images recorded in succession and can be converted into the movement of a cursor (inter alia).

Figure 5:
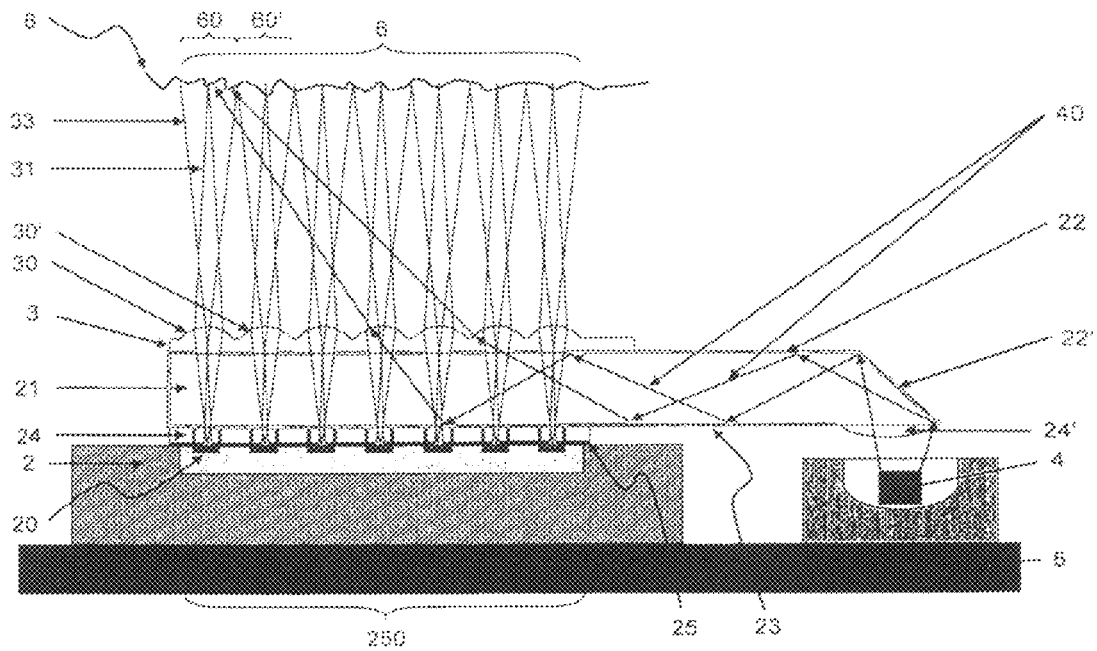
FIG. 5 shows a combined illuminating and imaging lens system of the device according to the invention, having a laterally offset light source on a common printed circuit board.

The embodiment according to FIG. 5 uses the same microlens array 3 as illuminating and imaging lens system, i.e. the element 3 and the element 26 coincide. For this purpose, the aperture diaphragm arrangement 22 and the diaphragm arrangement 23 are configured for this purpose to be reflective at least on one side for the illumination light 40, i.e. they consist preferably of metal, in particular chromium or titanium.

The light of the illumination source 4 is coupled via the spacer or a beam-forming lens system 24' situated there, e.g. refractive or diffractive lens(es) into the optically transparent carrier 21. The metalized layer 22' which extends at a diagonal angle to the normal to the carrier 5 deflects the illumination light so that it is reflected to and fro between the reflecting layers 22 and 23 and also the metalized edging of the optically transparent carrier 21. The reflection of the illumination light 40 can take place by direct mirroring on the metalized aperture side of the reflecting layers 22, 23 and/or by total reflection at least on the reflecting layer 22 (or 22' if this layer is not metalized). The aperture layers 22, 23 have, despite their locally reflecting properties, transparent openings inside the aperture edge, e.g. below a microlens 30, 30'. Furthermore, the layer of the aperture diaphragm arrangement 22 can also be provided to be absorbing (at the top) on the object side, e.g. made of a black matrix polymer, and reflecting (at the bottom) on the image side, e.g. made of a metal. Conversely, the aperture arrangement 23 can be provided to be reflecting (at the top) on the object side, e.g. made of a metal, and absorbing (at the bottom) on the image side, e.g. made of a black matrix polymer. Both serve the purpose of absorbing interfering light, on the one hand, before it reaches the detectors but, on the other hand, of reflecting usable illumination light in order that it passes to the tracking surface 6.

The angle of 22', the optional beam-forming lens system 24', the thickness of the optically transparent carrier 21 and also the size of the openings of the aperture diaphragm arrangement 22 and of the diaphragm arrangement 23 are produced such that, on the one hand, as much illumination light 40 as possible is imaged, on the object side, by the microlens array 3 onto the tracking surface 6 and, on the other hand, as little as possible illumination light 40 falls directly onto the detectors 20. In order to assist the latter, the spacer layer 24 can be provided as an arrangement of multiple spacers, with a respective basic area which is between the size of the lens aperture and the size of the photoactive detector pixel surface. The intermediate spaces between adjacent spacers can then be filled in addition with an absorbing polymer, e.g. a black matrix polymer (perpendicular optical insulation).

In this arrangement, the result characteristically is a multichannel illumination with large angles of incidence relative to the tracking surface so that the arrangement is used preferably (but not necessarily) in conjunction with a coherent light source, e.g. a laser diode.

Figure 6:
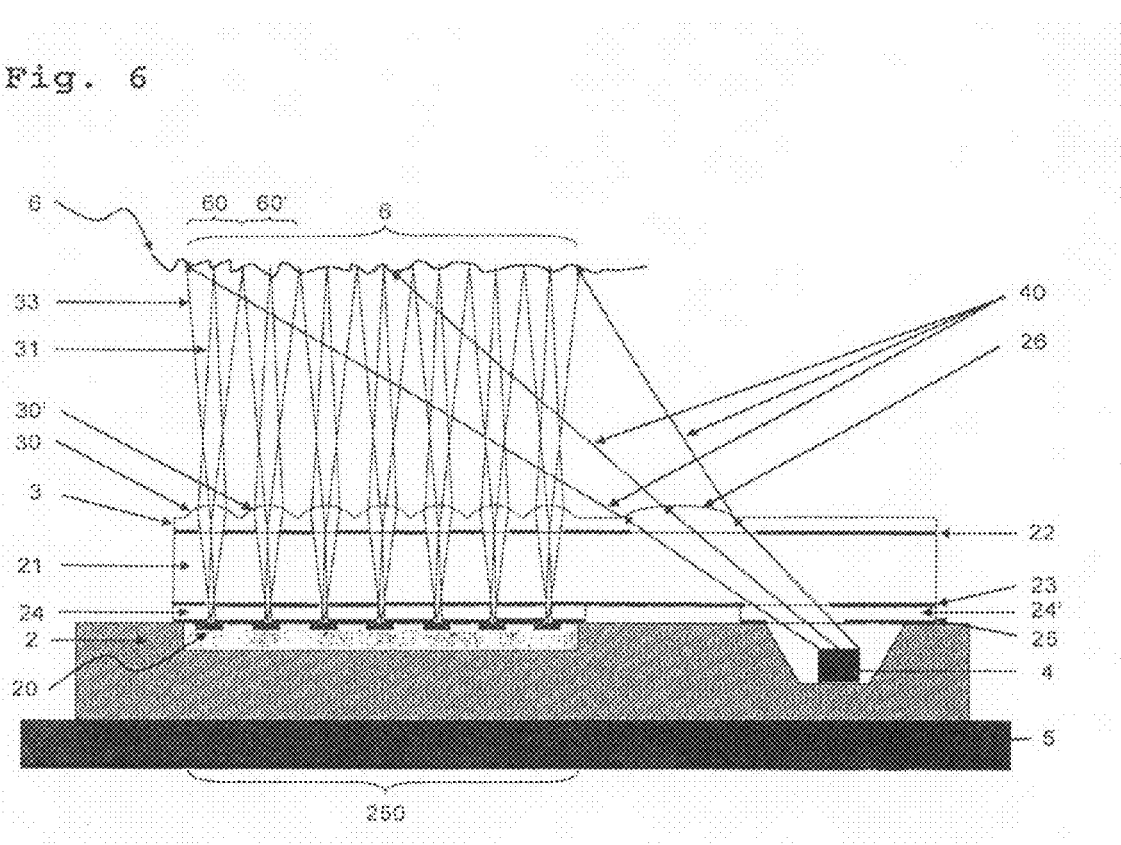
FIG. 6 shows the lens system of a device according to the invention, having a light source integrated on the semiconductor substrate of the image sensor.

In the embodiment according to FIG. 6, the light source 4 and also the electrical current supply thereof and associated control circuits are integrated directly on the semiconductor material of the image sensor 2. For this purpose, corresponding electrical contacts and strip conductors can be incorporated in the plans already in the image sensor design and integrated in the CMOS process of the image sensor production (corresponds to an application-specific integrated circuit, in brief ASIC). After production of the image sensor, recesses are then introduced into the semiconductor substrate, e.g. by isotropic or anisotropic etching or micromachining, in which the source is then positioned. As a result, an also laterally very compact construction of the total optical navigation sensor is produced.

The recess introduced into the semiconductor material can optionally take over the function of a reflector lens system, e.g. by smoothing or subsequent metallization. By means of the choice of a suitable machining process (the production of the recess by anisotropic and/or isotropic etching is intended), a special profile of the reflector surface can be adjusted, which, in cooperation with the illuminating lens system 26 and possibly 24', allows improved illumination of the tracking surface 6.

The optical arrangement can be applied then, for example by bonding or UV gluing, directly on the semiconductor substrate section. The function of the optical construction is analogous to the description of FIG. 1.

Figure 7:
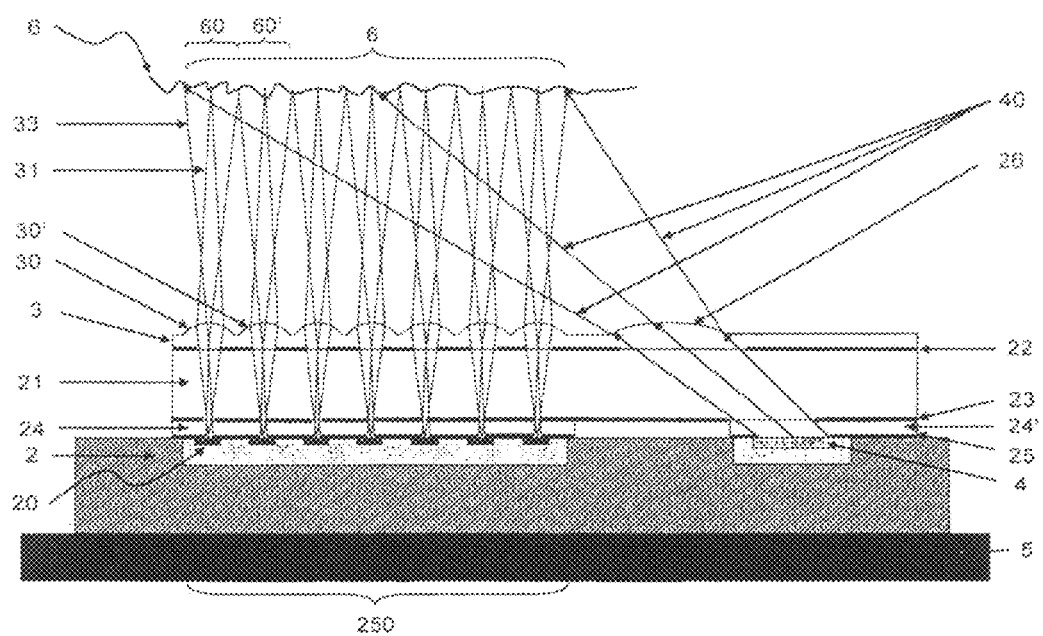
FIG. 7 shows the lens system of a device according to the invention, having a flat-design light source which is integrated on the semiconductor substrate of the image sensor.

A further embodiment according to FIG. 7 uses light sources which are structured directly on the semiconductor material, e.g. inorganic LEDs or organic LEDs (in brief OLEDs). This embodiment shows the use of an OLED-based structured light source with integrated photodetectors on a CMOS carrier substrate (also known as: "OLED-on-CMOS" or "bidirectional microdisplays"). Organic LED(s) are thereby integrated as layer-like light source(s), e.g. by evaporation-coating, directly on the semiconductor material and operated by electrical contacts from the CMOS circuits. This solution represents a monolithic connection of the detector units to the light sources on one semiconductor substrate.

Described in simple terms, special electrical contacts are jointly integrated for this purpose inside the CMOS process chain (design and production), on which a special metal layer is then applied as uppermost layer ("top metal"). This layer serves as lower electrode for the OLED materials which are subsequently deposited thereon and hence specifies the size of an illuminating source surface. These are covered and finally encapsulated by a further transparent electrode layer.

Corresponding compensation layers on the image sensor ensure that no chemical or mechanical micromachining of the semiconductor material, as in FIG. 6, is necessary.

A further advantage of the technical production in connection with organic LEDs is the possibility of ensuring illumination over an extended surface. A corresponding arrangement is shown in diagonal view in FIG. 8 (on the left). In order to ensure a diagonal angle of incidence of the illumination light 40 on all sides as far as possible (amplified contrast of the scattering on the microstructure of the tracking surface with incoherent source, similar to dark-field illumination in the microscope), the source and hence also the beam-forming lens system 26 can be configured to be frame-shaped or annular, as shown in FIG. 8. On the other hand, the OLED source in FIG. 8 (on the right) can also be structured, e.g. it would be advantageous to be able to actuate each side of the illumination frame or individual parts thereof individually. Thus, the object can be illuminated possibly sequentially in succession always only from one side. The four resulting images with illumination from four different directions can be compared or weighted with respect to image contrast in order to improve the accuracy of the measurement of the relative movement.

Since an illumination diagram with light which is incident from all sides at the same time at a flat angle, in the case of an incoherent light source, e.g. ring illumination in the dark-field mode of a microscope, requires a light-sensitive imaging lens system with a long exposure time and hence low image repetition rate, this diagram is unsuitable for a very rapid optical navigation sensor (e.g. mouse sensor). For this reason, the sources can illuminate the tracking surface 6 with a lateral delay so that respectively only one side is illuminated in two successive images. For this purpose, a correspondingly rapid (electrical) modulation of the light sources is required. The multiple detection of the relative movement with different illumination directions increases the detection reliability above all in the case of a direction-dependent microstructure of the tracking surface 6.

Figure 9:
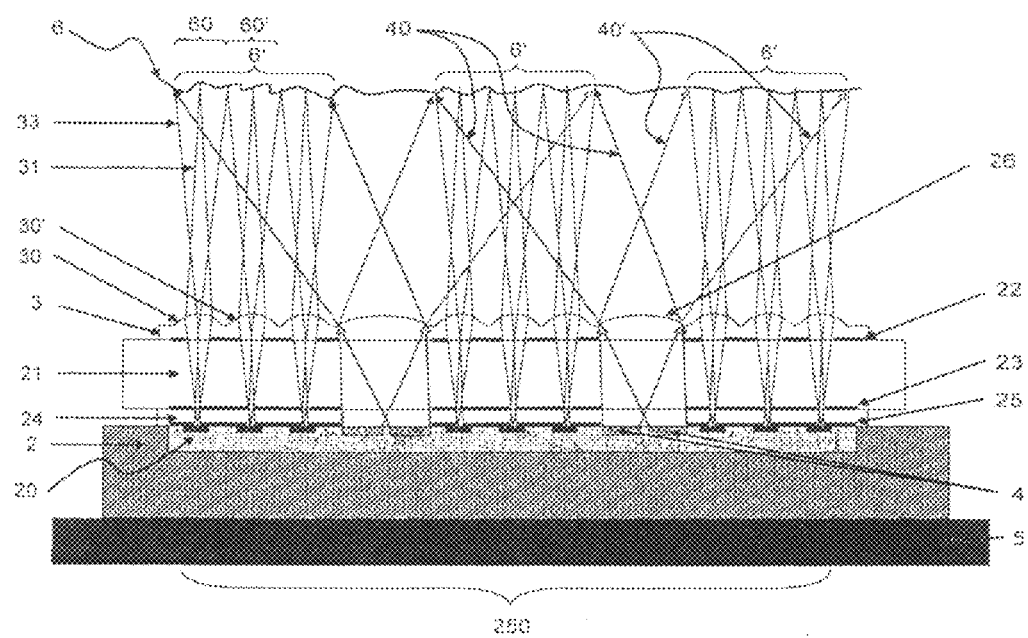
FIG. 9 shows the lens system of a device according to the invention, having multiple, microstructured light sources which are integrated on the semiconductor substrate of the image sensor in intermediate positions between the imaging channels.

The embodiment shown in FIG. 9 is distinguished from the others as a result of the fact that multiple, planar-design light sources (OLEDs) are structured in intermediate positions inside the detector array (folding of detector array of the image sensor and light source arrangement). In each intermediate position, individual sources and/or arrays of sources 4 can be situated. By means of an offset of the centres of the individual light sources 4 relative to the centre (or centres) of the beam-forming lens system 26, a diagonal illumination angle onto the regions of the tracking surface 6', viewed from the microlenses 3, 30, 30', is produced. By means of a suitable illumination lens system 26, for example the light of the respectively right source 40 can be used for illumination of the respectively left region and the light of the respectively left source 40' for illumination of the respectively right region of the tracking surface 6'. In fact, the tracking surface in the illustrated arrangement is not scanned without gaps, nevertheless a small partial image is produced by a small number of channels per scanning region 6' so that the movement relative to the tracking surface can take place by temporal correlation of the partial images or other evaluation methods, such as e.g. extraction of optical flow.

When using incoherent OLED light sources, a corresponding illumination with a diagonal angle of incidence to the tracking surface should be sought in order to obtain as high a contrast as possible of the illumination light scattered on the microstructure.

Figure 10:
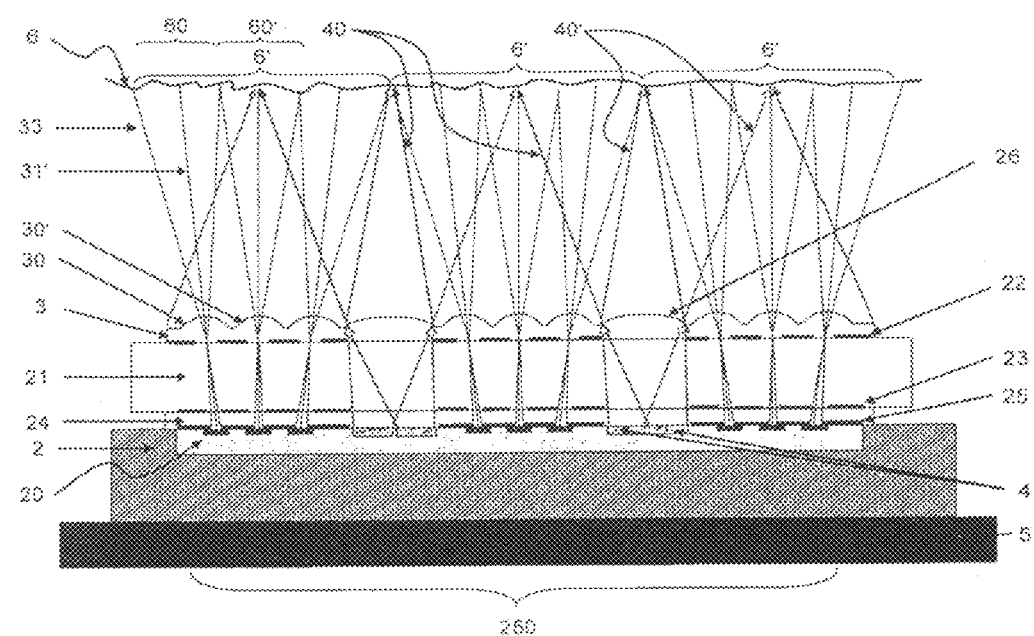
FIG. 10 shows the lens system of a device according to the invention, having optical axes which are inclined relative to each other, and multiple, microstructured light sources which are integrated on the semiconductor substrate of the image sensor in intermediate positions between the imaging channels.

FIG. 10 is intended to clarify the use of optical axes 31' of the adjacent imaging channels which are inclined relative to each other. In order to achieve this, the centre distance of the individual elements (microlens, aperture diaphragm, diaphragm etc.) in the array increases constantly outwards from the image plane. This means that the centre distance of adjacent detector elements 20 is smaller than the centre distance of the diaphragms of the imaging array of the diaphragm arrangement 23. This is in turn smaller than the centre distance of the aperture diaphragms 22 and this is finally smaller than the centre distance of the microlenses 30 and 30'. The axial variation of the centre distances is designed such that the partial parts of the tracking surface 6', observed from each array of continuous imaging channels, abut against each other and hence gap-free scanning of the latter is produced. The use of optical axes of the imaging channels, inclined relative to each other, can also be used in FIGS. 1 to 6 in order to image a region of the tracking surface 6 which is laterally greater than the image sensor or the detector arrangement 20.

In the arrangement, multiple, planar-design light sources (OLEDs) in intermediate positions are structured inside the detector array (folding of detector array of the image sensor and light source arrangement). In each intermediate position, again individual sources and/or arrays of sources can be situated. The illumination lens system 26 is produced such that the radiation emitted from the light sources 4 at a given angle spectrum is distributed as homogeneously as possible by 26 onto a region which is precisely as large as the region of the tracking surface 6', viewed from a segment of the microlens array. The region of the tracking surface illuminated by one source arrangement 4 can thereby be displaced laterally towards the region of the tracking surface 6', viewed from a segment of the microlens array, by half the diameter. A gap-free illumination of the extended tracking surface 6 is ensured by the connection of the illumination fields of the adjacent source arrangements 4.

Figure 11:
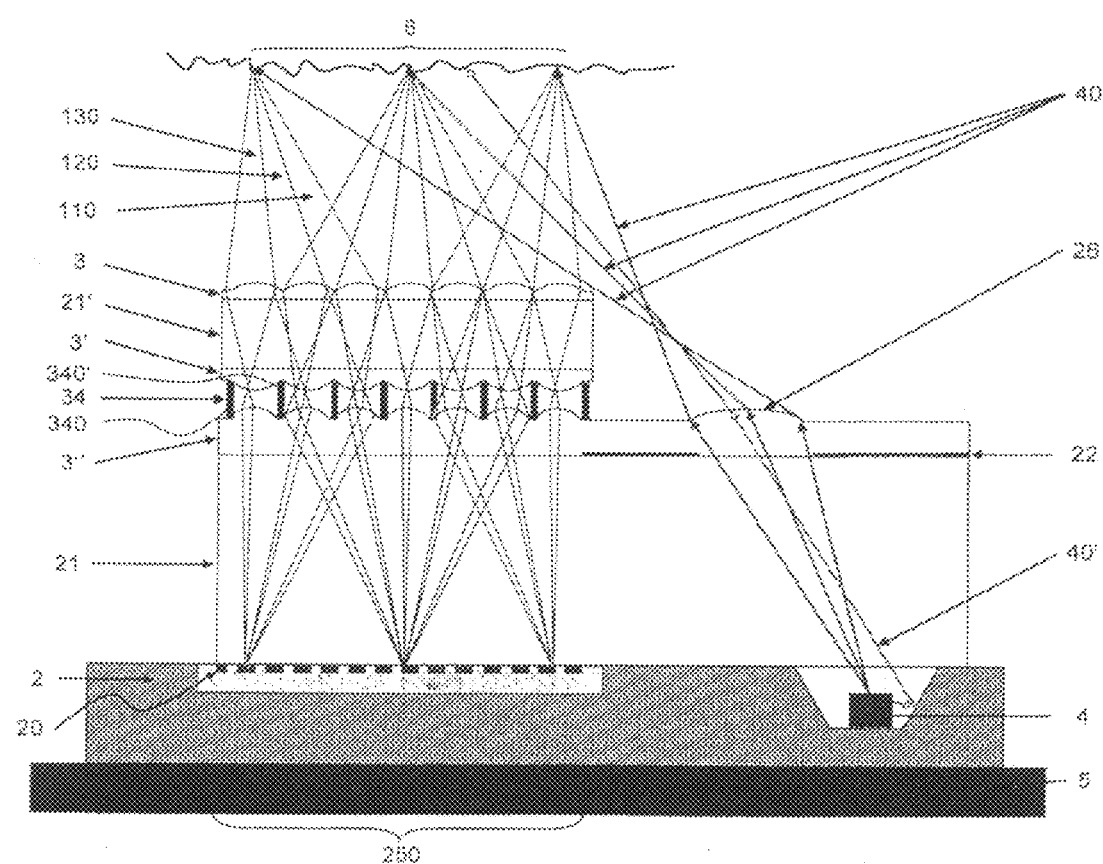
FIG. 11 shows the lens system of a device according to the invention using an array-type arrangement of microtelescopes, i.e. three microlenses situated in succession in one channel with two-stage imaging including intermediate image for the imaging array and an individual beam-forming lens system in the illumination array.

FIG. 11 shows a further embodiment. In order to increase the light sensitivity, also the use in particular of a plurality of (tightly packed) detector pixels inside the footprint of the microlenses is intended to be allowed. For this purpose, groups of pixels with a small centre distance in the footprint of the individual microlenses is necessary, the group centres having a significantly larger centre distance (comparable with those of the microlenses).

In this embodiment, not only one pixel in each individual channel but an image which consists of a few pixels, is low-resolution, side-reversed and stands upside down is read out. In order to make a total image from the many partial images obtained per channel, each partial image must be reflected on its main axes (x, y). This can take place, hardware-wise, in the same logical circuit or a signal processor (e.g. ASIC, FPGA) in which also calculation of the relative displacement takes place with the help of the correlation of the total images of the sensor, recorded in succession.

In this embodiment, it is advantageous to ensure suppression of optical crosstalk by vertical separation walls which extend at least partially through the axial intermediate space between the individual channels. The reason for this: the previously described horizontal aperture layers would have to have a larger diameter for the individual openings during recording of a small image per channel, which counteracts blockage of the bundles of optical crosstalk which run at a diagonal angle through the system.

Axially (at least partially) vertically extending separation walls are achieved by replacing the optically transparent carrier by a significantly thinner, optically transparent carrier, on the rear-side of which axially thick/deep spacer platforms or columns made of polymer, e.g. SU8, or plastic material are formed. The channels situated between the spacer platforms or columns are filled with an absorbing material, e.g. a black matrix polymer.

The lateral part of the carrier on which the illuminating lens system is situated can be produced likewise in this case, merely an outer vertical separation wall being required here, which serves to screen the imaging part from the direct radiated light of the source. The platform is therefore produced at that position with a lateral extension which corresponds to the maximum extension of the illuminating beam path.

On the rear-side of this layer structure, again the diaphragm arrangement with the already mentioned properties can be situated (in order to increase the resolution in the case of relatively large detector pixels).

Further embodiments are produced by using a second arrangement for the multichannel imaging lens system in which at least two, advantageously three, microlens arrays are placed axially in succession. The advantage of this arrangement is the increased light sensitivity of the imaging array which is achieved by the specific, image-side superimposition of individual light bundles from the object space 110, 120, 130 (superposition). As a result, the constructional length of the optical navigation sensor is increased so that the system no longer has the axial length of less than 2 mm, but an axial length<3 mm, from the upper edge of the image sensor 2 to the tracking surface 6.

In FIG. 11, the arrangement of the imaging array, already known from FIG. 6, is replaced by a multichannel microlens with three microlens arrays situated in succession. An individual single-channel or multichannel illuminating lens system 26 is used in order to distribute the light 40 of the light source 4 which is integrated on the semiconductor substrate 2 onto the observed region of the tracking surface 6. The illuminating lens system 26 can be again refractive and/or diffractive and/or reflective here. Optionally, in addition the recess in the semiconductor material 2 in which the lights source 4 is mounted can be provided for this purpose as a reflector. Hence, light of the source 4, which is radiated also at a large angle to the side, can be used for illumination of the tracking surface 6 (see beam path of 40'). The latter is sensible above all when using LEDs as light sources.

The aperture diaphragm arrangement 22 is provided in this case alone on the illumination side in order to prevent direct illumination light reaching diagonally into the imaging lens system and then in the direction of the image sensor array 20.

Figure 12:
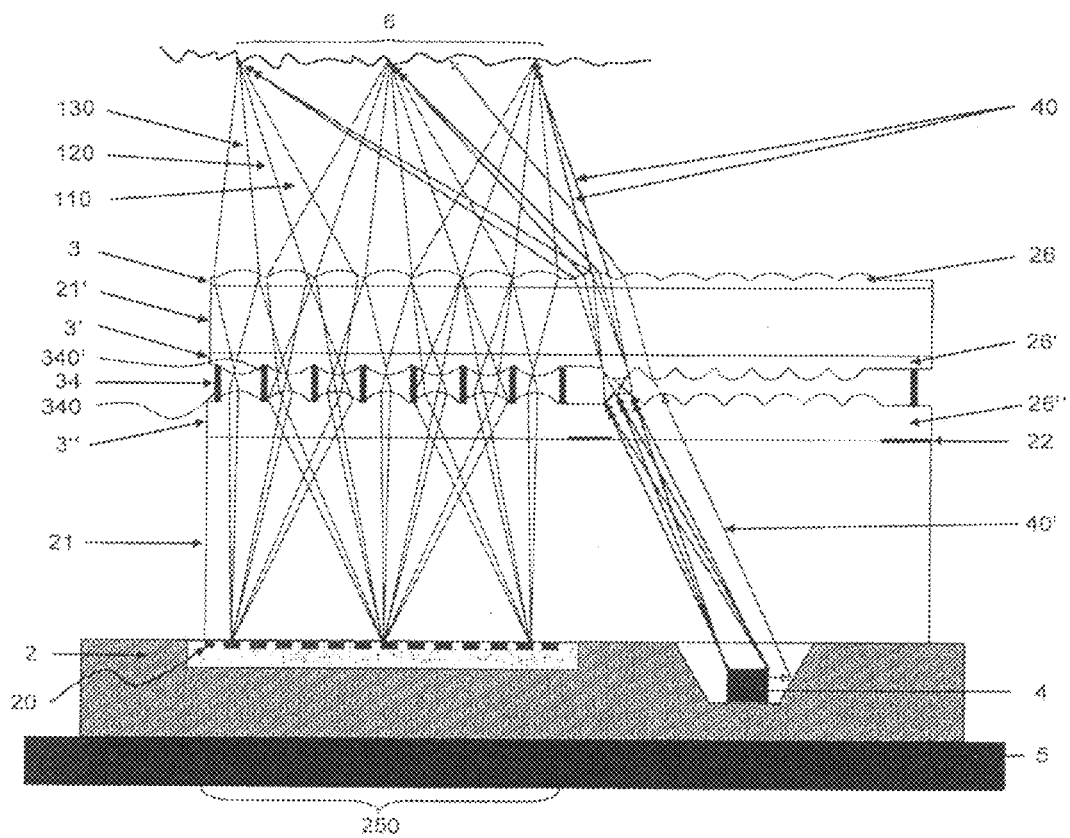
FIG. 12 shows the lens system of a device according to the invention using an array-type arrangement of microtelescopes, i.e. three microlenses situated in succession in one channel with two-stage imaging, including intermediate image for the imaging array and a multichannel beam-forming lens system, having up to three microlens arrays situated in succession in the illumination array.

A further embodiment according to FIG. 12 also uses, on the illumination side, at least two (or three) single-channel or multichannel beam-forming lens systems 26, 26', 26" which are situated in succession. In the case of axially stacked multichannel beam-forming lens systems, e.g. microlens arrays, the individual arrangements 26, 26' or 26" are offset at an increasing distance from the light source 4 relative to the latter in the direction of the centre of the tracking surface 6 to be illuminated. This offset is necessary in order to ensure a corresponding deflection of the illumination beams 40, 40' relative to the tracking surface 6. By using a plurality of channels, homogenisation of the illumination radiation is achieved at the same time with as compact a construction as possible. The divergent bundles emanating from each microlens of the object-side array 26 are superimposed on the tracking surface 6 so that the large number of overlapping light fields produces a homogeneous light distribution.

The microlens arrays 26, 26' and 26" can differ from each other and also in at least one property, compared with the imaging microlens arrays 3, 3' and 3".

The light-impermeable spacer layer 34 serves in the imaging array for preventing optical crosstalk and is not necessary in the illuminating beam path so that, in the illumination array, a light-impermeable spacer column (340) at the lateral edge of the carrier 21' and 21, is necessary as mechanical support frame for the optically transparent carrier 21' and the microlenses 26, 26' situated thereon on the front- and rear-side.

The aperture diaphragm arrangement 22 is provided here again only on the illumination side in order to prevent direct illumination light diagonally reaching into the imaging lens system and then in the direction of the image sensor array 20.

Figure 13:
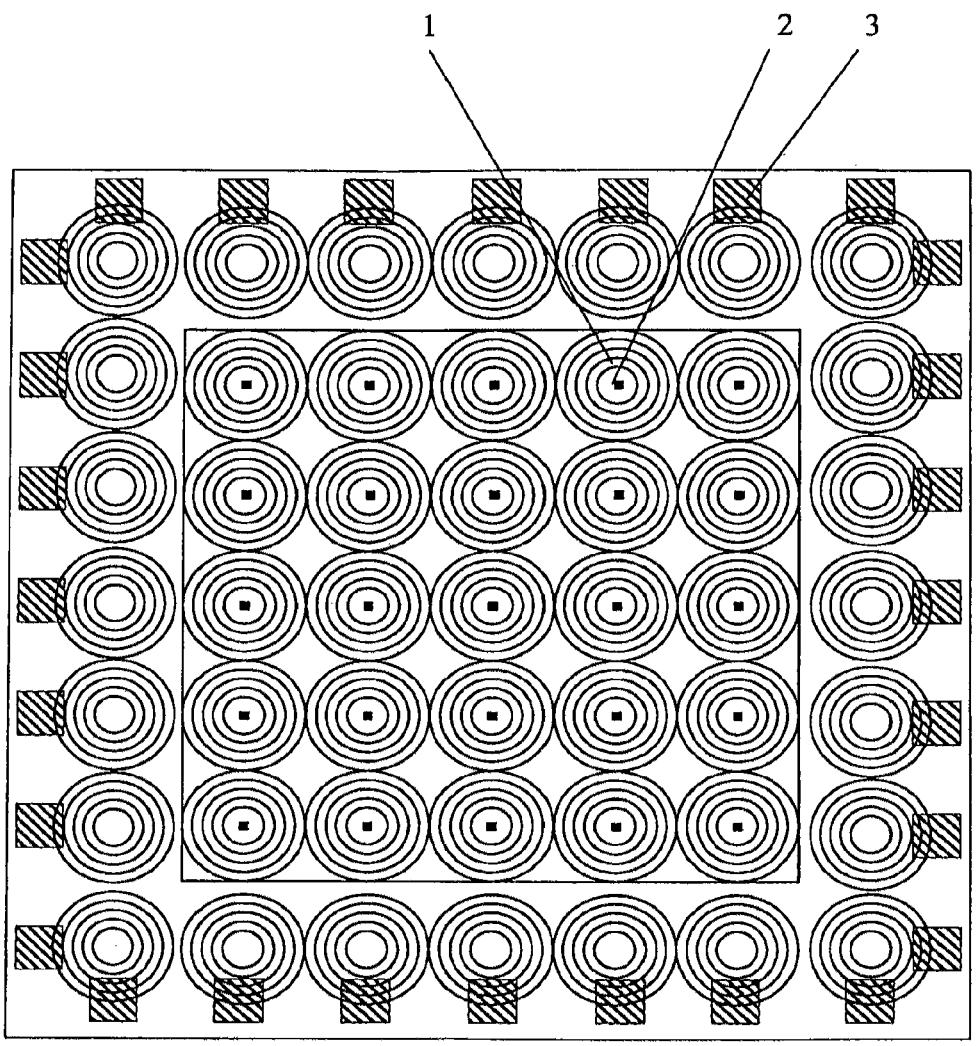
FIG. 13 shows a view of the device according to the invention according to FIGS. 7 to 9 with reference to height profiles of the individual microlenses.

The plan view represented in FIG. 13 relates to the embodiments according to FIGS. 7 to 9. The height profiles of the microlenses 1, represented here, are represented respectively by concentric circles. In the present case, the microlenses for the imaging on the respective sensor pixel are the same size as those of the beam-forming lens system. Furthermore, the device according to the invention has detector pixels 2 and beam sources 3, which can be actuated independently of each other, e.g. OLED pixels. The latter are likewise disposed on the detector plane below the microlens plane. The offset of the centres of the microlenses of the beam-forming lens system achieves a diagonal angle of incidence of the light of the sources through these onto the tracking surface.

The invention also conceives a method for controlling a cursor on an image output device by means of a relative movement between image sensor and object to be imaged or in the field of finger navigation utilizing the optical navigation device as described above. This is preferably carried out through the use of an optical navigation device, produced by wafer technology having an image sensor array having a large number of image sensor units disposed in an array, having respectively at least one light-sensitive surface, and at least one microlens array which is assigned to the image sensor array and disposed between an object to be imaged and the image sensor array, at least one microlens being assigned to each image sensor unit and also at least one radiation source having at least one associated beam-forming lens system. The image sensor array and the at least one radiation source are disposed together on one carrier structure and also at least one microlens array and at least one beam-forming lens system are disposed together on one optically transparent substrate. Individual optical channels are disposed between the image sensor units and the microlenses, the individual optical channels are optically insulated, and at least one diaphragm for restricting the angle spectrum of an electromagnetic radiation of the radiation source is disposed between the beam-forming lens system and the radiation source.

The invention claimed is:

1. An optical navigation device, produced by wafer technology having
   (a) an image sensor array having a large number of image sensor units disposed in an array, having respectively at least one light-sensitive surface,
   (b) at least one microlens array which is assigned to the image sensor array and disposed between an object to be imaged and the image sensor array, at least one microlens being assigned to each image sensor unit and also
   (c) at least one radiation source having at least one associated beam-forming lens system,
   wherein the image sensor array and the at least one radiation source are disposed together on one carrier structure and also
   at least one microlens array and at least one beam-forming lens system are disposed together on one optically transparent substrate,
   wherein individual optical channels are disposed between the image sensor units and the microlenses,
   wherein the individual optical channels are optically insulated, and
   at least one diaphragm for restricting the angle spectrum of an electromagnetic radiation of the radiation source is disposed between the beam-forming lens system and the radiation source,
   wherein the microlenses are orientated relative to the respectively associated image sensor unit such that the connection lines between lens apex and the center of the respectively associated image sensor unit extend parallel between adjacent optical channels.

2. The device according to claim 1, wherein the carrier structure is a printed circuit board and/or a semiconductor substrate.

3. The device according to claim 1, wherein the radiation source is selected from the group consisting of light diodes, organic light diodes, laser diodes and combinations thereof.

4. The device according to claim 3, wherein the radiation sources can be actuated electrically independently of each other.

5. The device according to claim 3, wherein inorganic or organic light diodes is (are) integrated as layer-like radiation source(s) on the semiconductor substrate of the image sensor and their electrical actuation circuits are provided by the CMOS technology of the image sensor.

6. The device according to claim 1, wherein a homogeneous distribution of the radiation of the radiation source on the object to be imaged by refraction, diffraction, reflection and/or frustrated total reflection is effected by the beam-forming lens system.

7. The device according to claim 6, wherein the aperture diaphragm layer and/or the diaphragm layer consists of an absorbing or a material which is reflecting at least on one side.

8. The device according to claim 7, wherein the absorbing material is a black matrix polymer, and the material which is reflecting at least on one side, is one of titanium, chromium, black chromium or nanostructured silicon (black silicon).

9. The device according to claim 1, wherein the beam-forming lens system has a plurality of optical channels which are constructed in particular in the manner of an array.

10. The device according to claim 9, wherein at least one diaphragm layer is disposed on the side of the optically transparent substrate which is orientated away from the microlens array, which diaphragm layer suppresses, in the region of the microlens array, optical crosstalk between the individual optical channels of the image sensor array and, in the region of the beam-forming lens system, prevents radiation of the radiation source directly reaching the light-sensitive surfaces of the image sensor units.

11. The device according to claim 1, wherein at least one aperture diaphragm layer is disposed between the optically transparent substrate and microlens array or beam-forming lens system, which aperture diaphragm layer, in the region of the microlens array, prevents penetration of radiation between the microlenses of the microlens array and, in the region of the beam-forming lens system, enables restriction of the angle of radiation of the radiation emanating from the radiation source.

12. The device according to claim 1, wherein the microlenses are orientated relative to the respectively associated image sensor unit such that the connection lines between lens apex and the center of the respectively associated image sensor unit in the center of the image sensor array are perpendicular to the at least one assigned light-sensitive surface and, from the center towards an edge, the optical axes of the microlenses are increasingly diagonal to the assigned light-sensitive surface.

13. The device according to claim 1, wherein at least one microlens represents at least one part of the beam-forming lens system, also the imaging function of the microlens being maintained.

14. The device according to claim 1, wherein the microlenses are configured such that an object section, imaged on a first image sensor unit, is not joined to an object section imaged on a second image sensor unit.

15. The device according to claim 1, wherein an image sensor unit has precisely one light-sensitive surface and is assigned precisely to one microlens, the optical axis being essentially perpendicular to the light-sensitive surface.

16. The device according to claim 1, wherein the at least one microlens array or the beam-forming lens system are connected at least in regions via spacers to the image sensor array.

17. The device according to claim 1, wherein at least one optically transparent protective disc is disposed on the side of the microlens array orientated away from the image sensor array.

18. The device according to claim 17, wherein the protective disc consists of glass or an optically transparent polymer.

19. The device according to claim 17, wherein the protective disc acts as light guide by means of internal total reflection.

20. The device according to claim 1, wherein the image sensor array has a surface extension of 0.25 $\mu m^2$ to 10 $mm^2$.

21. The optical navigation device according to claim 1, wherein the image sensor array has from 100 to 10,000 image sensor units.

22. The optical navigation device according to claim 21, wherein the image sensor array has from 100 to 1,000, image sensor units.

23. An input device for a data processing unit, in particular portable systems, mobile telephones, PDAs, laptop or handheld, comprising an optical navigation device according to claim 1.

24. The device according to claim 23, wherein the input device is a computer mouse, a remote control or a console control device.

* * * * *